United States Patent Office 3,201,388
Patented Aug. 17, 1965

3,201,388
METHOD OF PREPARING 5'-RIBONUCLEOTIDES
Yoshio Tsuchiya, Yokohama-shi, Kanagawa-ken, Tadao Takenishi, Setagaya-ku, Tokyo, Tetsuya Kato, Kanagawa-ken, Hisao Mori, Setagaya-ku, Tokyo, and Masaharu Yoshikawa and Takehiko Ichikawa, Yokohamashi, Kanagawa-ken, Japan, assignors to Ajinomoto Co., Inc., Tokyo, Japan
No Drawing. Filed Apr. 18, 1963, Ser. No. 273,821
Claims priority, application Japan, Apr. 20, 1962, 37/15,372; Sept. 10, 1962, 37/38,474
9 Claims. (Cl. 260—211.5)

This invention relates to the preparation of 5'-ribonucleotides, and more particularly to a method of synthesizing 5'-nucleotides from the corresponding nucleosides.

The sodium salts of the 5'-ribonucleotides, and particularly sodium 5'-inosinate and sodium 5'-guanylate have a pleasant taste and are useful seasoning agents. They also have known pharmacological effects.

It is known to prepare 5'-nucleotides from the corresponding nucleosides by phosphorylation. The known methods include a first step in which the hydroxyl groups in position 2' and 3' are converted to a less reactive radical, separation of the intermediate so obtained from the reaction mixture and phosphorylation of the hydroxyl group in position 5', followed by reconversion of the groups in positions 2' and 3' to the original hydroxyl groups. The known methods thus proceed in at least two steps and require isolation of an intermediate product. The operations are relatively complex and time consuming, the reagents are quite costly and the yields are too low to justify industrial production at this time.

We have succeeded in converting ribonucleosides into the corresponding nucleotides in a single operation without the need for isolation of an intermediate product. The reagents employed are readily available at low cost. The manipulative steps of the method are simple. It readily lends itself to operation on an industrial scale.

The method of the invention is characterized by a sequence of reactions between a nucleoside, an alkanone, and phosphorus oxychloride or its products of partial hydrolysis. The 5'-hydroxyl group of the nucleoside is selectively phosphorylated substantially without reaction of the hydroxyl groups in position 2',3' if the reagents are combined in a certain range of ratios. When the reagents are combined in different ratios, 2',3'-O-alkylidene nucleosides are preferentially or selectively formed, and may be isolated or further converted to the corresponding 5'-nucleotides without being isolated. The following reactions take place:

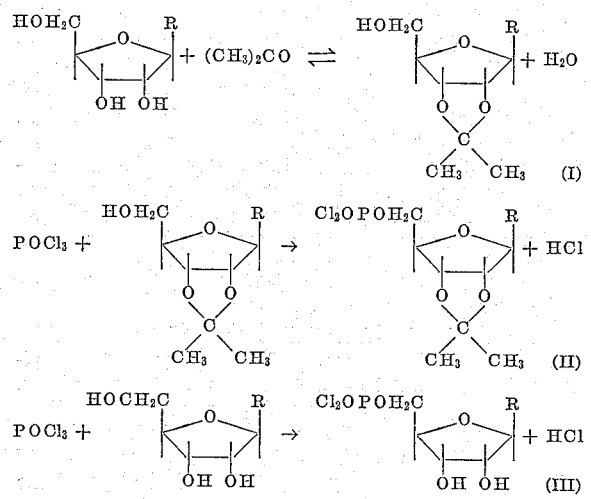

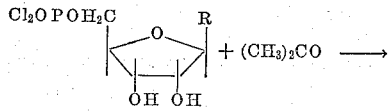

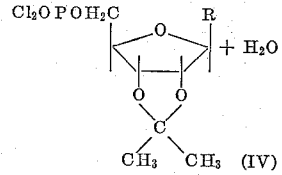

It will be noted that phosphorylation of the nucleoside according to Formula III proceeds directly from the nucleoside to the nucleotide without protection of the hydroxyl groups in positions 2' and 3'. R in Formulas I to IV is a purine or pyrimidine base. Adenine, guanine, cytosine, uracil, hypoxanthine and thymine are typical of the bases in the nucleosides adapted to undergo reactions I to IV. Acetone may be replaced by other alkanones and cycloalkanones of the formula

R'—CO—R"

wherein R' and R" are lower alkyl or alkylene radicals, the alkylene radicals being joined to form a ring.

It is assumed that nucleosides dissolve in polar phosphorus oxychloride when a lone-pair electron in a nitrogen atom of the nucleoside is coordinate with a proton of the hydrated phosphorus oxychloride.

The reactions of the invention take place in an acidic medium which is particularly favorable to the phosphorylation of guanosine. It is known that guanosine is difficult to phosphorylate with phosphorus oxychloride in pyridine solution because of hydrogen bond formation between the 2-amino-group and the 5'-hydroxyl group of the guanosine (H. G. Khorana, J.A.C.S. 79, 3747, 1957). The method of the invention succeeds in phosphorylating guanosine because of the protonation of the 2-amino group and the consequent disruption of the aforementioned hydrogen bond.

The influence of the ratio of reagents in the reaction between inosine and phosphorus oxychloride, and the influence of the hydrating agent on the yield of 2',3'-O-alkylidene 5'-nucleotide are evident from Table I. In the test runs reported in the table, one mole of inosine was mixed with the indicated amounts of $POC_3$, acetone, and hydrating agent, and the mixture was left to stand at a temperature of 4 to 8° C. for a uniform period of several hours. Sodium 5'-inosinate was recovered from the reaction mixture by conventional methods more fully described in specific examples hereinbelow.

TABLE I

| Test Run No. | Moles per mole inosine | | Hydrating Agent | Yield Percent |
|---|---|---|---|---|
| | $POCl_2$ | Acetone | | |
| 1 | 2.1 | 3 | (1) | 61 |
| 2 | 4.1 | 3 | (1) | 74 |
| 3 | 5 | 4 | (1) | 78 |
| 4 | 5 | 8 | (1) | 74 |
| 5 | 5 | 11 | (1) | 70 |
| 6 | 6 | 6 | (1) | 76 |
| 7 | 7 | 1.5 | (1) | 70 |
| 8 | 7 | 4 | (1) | 80 |
| 9 | 7 | 14 | (1) | 82 |
| 10 | 7 | 17 | (1) | 78 |
| 11 | 8 | 2 | (1) | 80 |
| 12 | 8 | 5 | (1) | 82 |
| 13 | 15 | 6 | (2) | 84 |
| 14 | 15 | 9 | (2) | 83 |
| 15 | 15 | 13 | (2) | 90 |
| 16 | 23 | 6 | (1) | 65 |
| 17 | 5 | 3 | none | 70 |

[1] 0.1 mole water.
[2] 0.25 mole tert-butanol.

It is evident from Table I that good yields are obtained over a wide range of reagent ratios. Under otherwise similar condition, best results are obtained with 4 to 20 moles phosphorus oxychloride per mole of ribonucleoside, and with 3 to 15 moles of ketone per mole of ribonucleoside.

When the amount of ketone present is relatively small, the reaction of the 2',3' hydroxyl groups with the ketone is slow, and this is preferred. The water formed by this reaction promotes the reaction rate and the ultimate yields of 2',3'-O-alkylidene-5'-nucleotide are high. The undesirable hydrolizing effect of the simultaneously formed hydrogen chloride on the bond between ribose and prine base may be avoided by passing an inert gas or even air through the reaction mixture to remove the HCl.

We prefer to suppress the unfavorable action of the hydrogen chloride by adding proton acceptors to the reaction mixture. A wide variety of proton acceptors may be employed. Suitable proton acceptors include organic bases such as pyridine or picoline; oxygen compounds such as dimethyl and diethyl ether, diisopropyl ether, dioxane, acetone, methylethylketone, cyclohexanone; inorganic bases such as calcium hydroxide, calcium oxide, lithium hydroxide; materials having molecular sieves effect, and many more. The addition of the proton acceptors is limited by their effect on the solubility of the nucleosides in the reaction medium. For this reason, the proton acceptors are added to the reaction mixture some time after the start of the reaction. It is to be noted that ketones act both as reagents and as proton acceptors in the method of the invention.

When the molar ratio of ketone to the phosphorus oxychloride employed in the original reaction mixture is greater than five to 1, the formation of 2',3'-O-alkylidene derivatives is favored, and 2',3'-O-alkylidene derivatives of the nucleosides may be isolated from the reaction mixture in high yields. A relatively large amount of acid present is necessary and is provided by the hydrolysis of $POCl_3$. The phosphorus oxychloride and its products of partial hydrolysis take up the water formed in the ether formation, and produce HCl and additional products of $POCl_3$ hydrolyisis, which themselves promote the reaction.

The effects of the ratio of phosphorus oxychloride to nucleoside in the presence of a large excess of ketone are illustrated in Table II which shows the yields of isopropylidene inosine and isopropylidene guanosine obtained when one mole of the nucleoside was reacted with $POCl_3$ in the ratios indicated in the presence of 46 moles acetone containing one percent water. The reactants were mixed at 4 to 8 degrees C., and the reaction was terminated after one hour.

TABLE II

| Ration, $POCl_3$:nucleoside | Yield, percent | |
|---|---|---|
| | Isopropylidene inosine | Isopropylidene guanosine |
| 1.5:1 | 83 | 58 |
| 2:1 | 91 | 78 |
| 3:1 | 93 | 80 |
| 4:1 | 89 | 96 |
| 7:1 | 90 | 83 |

The isopropylidene nucleoside may be phosphorylated by removing the excess ketone from the reaction mixture and by adding more $POCl_3$, as needed. When a proton acceptor, such as an ether or an inorganic base, is present during phosphorylation, the yield of the phosphorylation step may exceed 90 percent. The reaction mixture is then dissolved in water to hydrolyze the 2',3'-O-alkylidene nucleoside 5'-phosphorodiochloridate formed, and the alkylidene group is split off by heating in a dilute aqueous acid medium. The 5'-ribonucleotides are isolated as crystals in yields of 70 to 75 percent by conventional methods.

The partial hydrolysis of phosphorus oxychloride in the method of this invention results in the formation of orthophosphorodichlroidic acid believed to be formed by the following reaction:

$$POCl_3 + H_2O \rightarrow HOPOCl_2 + HCl$$

It is known that phosphorus oxychloride may be partially hydrolyzed and suitable methods have been disclosed by Goubeau et al. (Z. Anorg. Allgem. Chem. 294, 224, 1958), Grunze et al. (Angew. Chem. 70, 73, 1958), Wazer et al. (J.A.C.S. 81, 6360, 1959), and Sambeth (Angew. Chem. 70, 594, 1958). The partially hydrated derivatives of phosphorus oxychloride prepared by the known methods may be employed successfully in the method of our invention. Crude mixtures or well defined purified compounds may be used. The use of purified products of hydrolysis avoids the problems resulting from the presence of HCl in the crude mixtures but the advantages gained are not sufficient to justify the relatively complex procedure required. We prefer to prepare the hydrolyzation products of phosphorus oxychloride in the reaction mixture itself from phosphorus oxychloride and water or a lower aliphatic alcohol. The tert-butanol of test runs Nos. 13, 14 and 15 in Table No. I may be replaced by methanol, ethanol, amyl alcohols or ether lower alkanols without materially affecting the yield.

An excessive amount of water added generates so much hydrogen chloride that the glycoside bond between the purine or pyrimidine base and the ribose is broken. When a lower aliphatic alcohol is employed as a hydrolyzing agent, the decomposition of the nucleosides is sharply reduced because orthophosphorodichloridic acid is formed without simultaneous formation of hydrogen chloride according to the formula $$POCl_3 + R_1OH \rightarrow POCl_2(OH) + R_1Cl$$

The method of the invention is further illustrated by the following examples but it will be understood that the invention is not limited thereto.

*Example 1*

One gram inosine, 5 milliliters phosphorus oxychloride, 0.17 milliliter tert-butyl alcohol, and 3.4 milliliters acetone were mixed at 5° C., and the mixture was maintained at this temperature with stirring for six hours. It was then poured into ice water to hydrolyze the chloridate formed. The aqueous solution obtained was adjusted to pH 1.5 with 6 N sodium hydroxide solution, and heated to 70° C. for twenty minutes to remove the isopropylidene group by hydrolysis. The pH was then adjusted to 3.0. The solution now contained 90% of the inosine originally used as the desired 5'-nucleotide.

The solution was then passed through a decolorizing column containing granular metaphenylenediamine (Centranol W-291). Inorganic material was washed with water from the column, and the inosine monophosphate was then eluted with 0.8 N sodium hydroxide solution. The eluate was adjusted to pH 7.7 and evaporated to a sodium inosinate concentration of 15 percent. The concentrate was diluted with two volumes of ethanol, and left to stand in an icebox. 1.5 grams sodium 5'-inosinate-7.5-hydrate were obtained, for a yield of 76 percent in terms of inosine originally employed.

*Example 2*

One gram inosine, 2.5 milliliters phosphorous oxychloride, 0.03 milliliter water, and 3.2 milliliters methylethylketone were mixed at 5° C. and left to react for one hour. 0.4 gram anhydrous calcium carbonate were then admixed to the reaction medium which was held six hours longer at 5° C. The solution obtained was poured into 20 milliliters ice water to hydrolyze the chloridate, and the preparation of sodium 5′-inosinate was continued in the same manner as in Example 1. There were obtained 1.4 grams sodium 5′-inosinate-7.5-hydrate. The yield thus was 73 percent.

*Example 3*

One gram guanosine, 10 milliliters phosphorous oxychloride, 2.4 milliliters methyl-isobutyl ketone, and 0.03 milliliter water were mixed at 5° C. by stirring. The mixture was permitted to react at that temperature for six hours. The reaction mixture was evaporated at −70° C. in a cooling bath of carbon dioxide snow and acetone, and unreacted phosphorus oxychloride was removed. Ice water was added to the residue to dissolve it. The pH of the solution was adjusted to 1.5, and the solution was heated to 70° C. for 30 minutes to remove the isohexylidene group by hydrolysis. The pH of the solution was then adjusted to 3.0 with 6 N sodium hydroxide solution, the partly neutralized solution was passed through a decolorizing column containing granular metaphenylenediamine resin (Centranol W-291), and the resin in the column was washed with water. The guanylic acid was eluted with 0.2 N sodium hydroxide solution, and the pH of the eluate was adjusted to 7.5–7.7. The neutralized eluate was evaporated until it contained 25% guanylate which was precipitated from the solution by means of ethanol as described in Example 1. One gram sodium 5′-guanylate was obtained for a yield of 70 percent.

*Example 4*

One gram adenosine, 0.3 milliliter phosphorous oxychloride, 1.6 milliliters acetone, 0.02 milliliter water were stirred together for one hour. After this period, 8 milliliters phosphorus oxychloride and 0.2 milliliter ether were added to the reaction mixture, and the reaction was permitted to continue for six hours. The solution was cooled to −70° C. by means of an external bath of solid carbon dioxide and acetone, and was concentrated. Volatile solvents and phosphorus oxychloride were removed. The residual solution was adjusted with aqueous NaOH to pH 1.5, and heated to 70° C. for 20 minutes to remove the isopropylidene group by hydrolysis. The hydrolysis mixture was adjusted with aqueous NaOH to pH 7.5–7.7, concentrated by evaporation, and diluted with ethanol to precipitate crystals of sodium 5′-adenylate. The crude crystals weighed 1.1 grams, corresponding to a yield of 77 percent.

*Example 5*

One gram inosine, 0.4 milliliter phosphorus oxychloride, 4 milliliters cyclohexanone, and 0.3 milliliter partially hydrated phosphorus oxychloride prepared according to Sambeth et al. (Angew. Chem. 70, 594, 1958) were stirred for sodium carbonate were added, and the reaction mixture was further held for six hours at 5° C. The unreacted excess of phosphorus oxychloride was distilled off at reduced pressure, and the residual solution was poured into ice water to hydrolyze the chloridate. The solution obtained was further worked up as in Example 1. There were obtained 1.56 grams sodium 5′-inosinate-7.5-hydrate, representing a yield of 79 percent.

*Example 6*

One gram guanosine, 0.3 milliliter phosphorus oxychloride, 2 milliliters acetone, and 0.1 milliliter tert-butanol were mixed by stirring at 5° C. After one hour, 8 milliliters phosphorus oxychloride were added to the reaction mixture which was then left to stand for six hours. It was then poured into ice water, its pH was adjusted to 1.5, and it was heated to 70° C. for twenty minutes. Processing continued as in Example 1, and 1.08 grams sodium 5′-guanylate were obtained, the yield being 75 percent.

*Example 7*

Two grams guanosine were added gradually to 120 milliliters anhydrous acetone containing 4.1 grams phosphorus oxychloride. The mixture was stirred for three hours at ambient temperature. Solution was complete after approximately one to two hours. The reaction mixture was poured carefully into 500 milliliters ice water, and a sufficient amount of 10 N sodium hydroxide solution was added to raise the pH to 8. The solution was partly evaporated to remove the excess of acetone, and then acidified with hydrochloric acid to pH 6. The precipitate formed was recrystallized from water and weighed 1.4 grams. It was 2′,3′-O-isopropylidene guanosine. The yield was 70 percent.

*Example 8*

Two grams inosine were gradually added with stirring to a mixture of 40 milliliters anhydrous acetone and 1.7 grams phosphorus oxychloride. A homogeneous solution was obtained after approximately three hours. Four hours after the start of the reaction, the mixture was transferred drop by drop to a container holding 500 milliliters ice water. The aqueous mixture was adjusted with 10 N sodium hydroxide to pH 8–9, and partly evaporated. The concentrate was adjusted to pH 4 with hydrochloric acid to induce crystallization of the 2′,3′-O-isopropylidene inosine formed. The yield was 1.84 grams (70%).

*Example 9*

166 grams phosphorus oxychloride were added gradually with stirring to 1.5 liters acetone containing 1 percent water. The temperature of the mixture was held at 30° C. by external water cooling. Ten grams inosine were then added in several portions with stirring, and a clear solution was obtained 15 to 30 minutes later while the temperature was maintained at 30° C. Thirty minutes after addition of the last part of the inosine, the reaction was terminated.

The pH was raised to 9 with 2.5 N sodium hydroxide solution, and the temperature of the solution was then lowered to 10° C. Crystals of sodium phosphate formed and were removed by filtration from the cold solution. The crystals were washed with a mixture of equal volumes of acetone and water, and the washings were combined with the filtrate. The combined liquid was evaporated in a vacuum to a volume of 1.5 liters and the concentrate was free from acetone. The concentrate was externally cooled with ice water, and its pH was adjusted to 6.8 with 2 N hydrochloric acid to precipitate the 2′,3′-O-propylidene inosine in crystalline form. The crystals were filtered off, washed with water, and dried. They weighed 8.3 grams (78.5% yield). Their melting point was 274–276° C.

*Example 10*

The procedural steps of Example 9 were repeated in several runs in which 4 grams phosphorus oxychloride, 80 grams acetone containing 1 percent water, and 2 grams ribonucleoside were reacted for varying periods. The nucleosides respectively reacted in these runs were adenosine, cytidine, uridine, and guanosine. The yields of the 2′,3′-O-propylidene derivatives obtained and the melting points of the products are listed in Table III.

TABLE III

| Nucleoside | Reaction time, Hours | Yield Percent | Melting Point, ° C. |
|---|---|---|---|
| Adenosine | 1 | 99 | 216 |
| Cytidine | 2 | 98 | 224 |
| Uridine | 1 | 99 | 161 |
| Guanosine | 1 | 95 | 300 |

*Example 11*

Four milliliters water were added to 250 milliliters methylethylketone, and 33.4 grams phosphorus oxychloride were gradually admixed with stirring and external cooling to keep the temperature of the mixture below 30° C. Twenty grams inosine were added last, and the mixture was stirred for thirty minutes when the reaction was completed. The pH of the reaction mixture was adjusted to 9–9.5 with sodium hydroxide, and the sodium phosphate formed was removed by crystallization at 10° C., followed by filtration. The filtrate was evaporated in a vacuum to remove the methylethylketone and to reduce the volume to 150–200 milliliters. The pH was then lowered to 6.8, and crystals of 2′,3′-O-isobutylidene inosine were thereby precipitated. After filtering and drying, they weighed 20.3 grams (85% yield). Their melting point was 274–277° C.

An elementary analysis had the following results:

Calculated for $C_{14}H_{18}O_5N_4$: C, 52.17; H, 5.63; N, 17.38. Found: C, 52.01; H, 5.89; N, 17.64.

*Example 12*

The procedural steps of Example 5 were repeated in four runs with equal amounts of adenosine, guanosine, cytidine, and uridine respectively replacing inosine. The corresponding 2′,3′ - O - propylidene nucleosides were obtained in yields of 90%, 57%, 93%, and 99% respectively.

*Example 13*

Four milliliters water were mixed with 250 milliliters cyclohexanone. The temperature of the mixture was kept below 30° C. by external water cooling while 33.4 grams phosphorus oxychloride were added in small portions with stirring. Twenty grams inosine were admixed last while stirring was continued. A temperature of 20 to 30° C. was maintained for one hour after addition of the inosine. The crude crystals obtained in the manned described in Example 9 were recrystallized from water. 22.8 grams 2′,3′ - O - cyclohexylidene inosine were obtained (88% yield), and had a melting point of 283–286° C.

Calculated for $C_{16}H_{20}O_5N_4$: C, 55.2; H, 5.8; N, 16.1. Found: C, 54.78; H, 5.86; N, 16.1.

While the invention has been described with particular reference to specific embodiments, it is to be understood that it is not limited thereto but is to be construed broadly and restricted solely by the scope of the appended claims.

What is claimed is:

1. A method of preparing a 5′-ribonucleotide from the corresponding ribonucleoside which comprises:
   (a) reacting said ribonucleoside with phosporus oxychloride in the presence of a ketone of the formula

R′—CO—R″ wherein R′ and R″ are hydrocarbon radicals selected from the group consisting of lower alkyl radicals and lower alkylene radicals, one of said R′ and R″ being an alkylene radical when the other one is an alkylene radical, and said alkylene radicals being connected to form portions of a cyclohexane ring, whereby a 2′,3′-O-alkylidene ribonucleoside-5′-phosphorodichloridate is produced;
   (b) reacting said phosphorodichloridate with water to transform said phosphorodichloridate into the corresponding 2′,3′-O-alkylidene-5′-ribonucleotide; and
   (c) hydrolyzing said 2′,3′-O-alkylidene-5′-ribonucleotide in an aqueous dilute acid solution.

2. A method as set forth in claim 1, wherein said ribonucleoside is reacted with said phosphorus oxychloride in the presence of a member of the group consisting of water and lower alkanols.

3. A method as set forth in claim 1, wherein said ribonucleoside is reacted with said phosphorus oxychloride in the presence of a proton acceptor.

4. A method of preparing a 5′-ribonucleotide from the corresponding ribonucleoside which comprises:
   (a) reacting said ribonucleoside with partially hydrolyzed phosphorus oxychloride in the presence of a ketone of the formula

R′—CO—R″ wherein R′ and R″ are hydrocarbon radicals selected from the group consisting of lower alkyl radicals and lower alkylene radicals, one of said R′ and R″ being an alkylene radical when the other one is an alkylene radical, and said alkylene radicals being connected to form portions of a cyclohexane ring, whereby a 2′,3′-O-alkylidene ribonucleoside - 5′ - phosphorodichloridate is produced;
   (b) reacting said phosphorodichloridate with water to transform said phosphorodichloridate into the corresponding 2′,3′-O-alkylidene-5′-ribonucleotide; and
   (c) hydrolyzing said 2′,3′-O-alkylidene-5′-ribonucleotide in an aqueous dilute acid solution.

5. A method as set forth in claim 4, wherein said partly hydrolyzed phosphorus oxychloride has the formula $HOPOCl_2$.

6. A method of preparing a 2′,3′-O-alkylidene ribonucleoside from the corresponding ribonucleoside which comprises reacting said ribonucleoside with a ketone of the formula

R′—CO—R″ wherein R′ and R″ are hydrocarbon radicals selected from the group consisting of lower alkyl radicals and lower alkylene radicals, one of said R′ and R″ being an alkylene radical when the other one is an alkylene radical, and said alkylene radicals being connected to form portions of a cyclohexane ring, in the presence of a phosphorus compound selected from the group consisting of phosphorus oxychloride and a product of the partial hydrolyzation of said phosphorus oxychloride.

7. A method as set for the claim 6, wherein said phosphorus compound has the formula $HOPOCl_2$.

8. A method as set forth in claim 6, wherein the molar ratio of said ketone to said phosphorus compound is greater than five to one.

9. A method as set forth in claim 6, wherein said ribonucleoside is selected from the group consisting of ribosides of hypoxanthine, adenine, cytidine, uracil, and guanine.

References Cited by the Examiner

UNITED STATES PATENTS

| | | | |
|---|---|---|---|
| 2,482,069 | 9/49 | Ruskin | 260—211.5 |
| 2,795,580 | 6/57 | Khorana | 260—211.5 |
| 2,946,781 | 7/60 | Shunk et al. | 260—211.5 |
| 2,970,139 | 1/61 | Duschinsky et al. | 260—211.5 |

FOREIGN PATENTS

| | | |
|---|---|---|
| 1,119,278 | 12/61 | Germany. |
| 621,094 | 4/49 | Great Britain. |

LEWIS GOTTS, *Primary Examiner.*